Dec. 20, 1927.
R. W. BURNS
1,653,035
CLAMP CARRIER
Filed Nov. 12, 1925
4 Sheets-Sheet 1
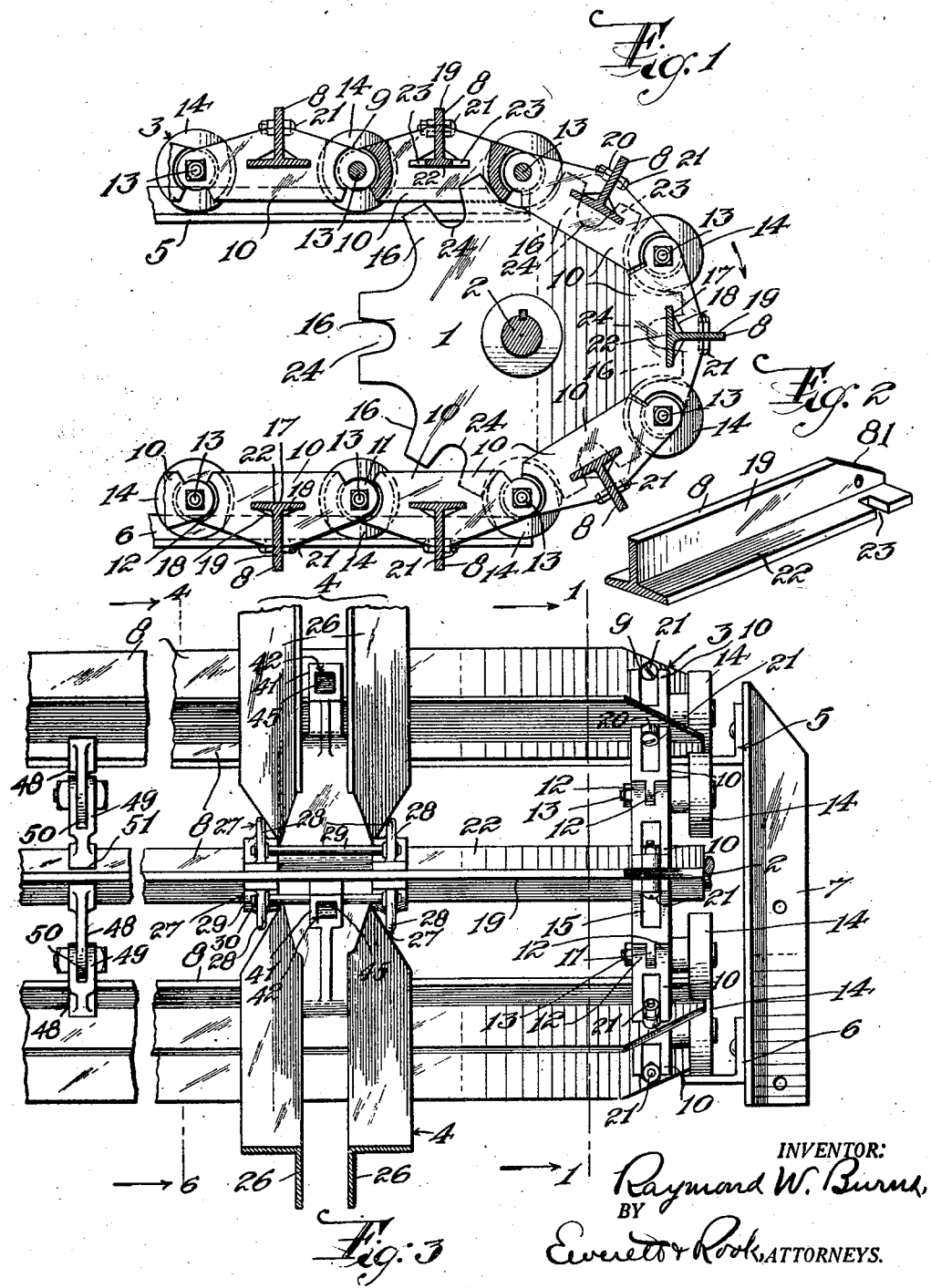

Dec. 20, 1927.

R. W. BURNS 1,653,035

CLAMP CARRIER

Filed Nov. 12, 1925

INVENTOR:
Raymond W. Burns,
BY
Everett & Rook, ATTORNEYS.

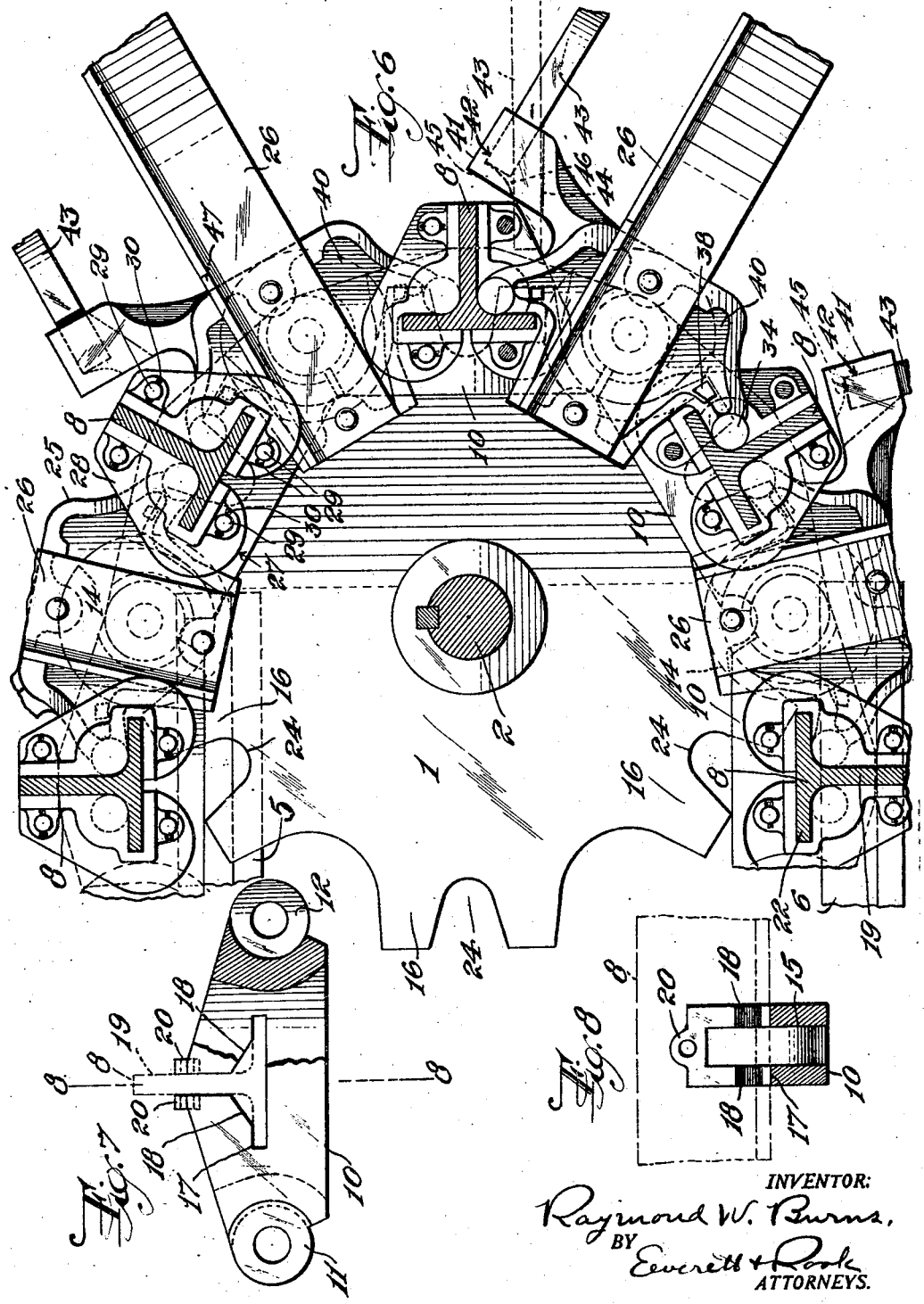

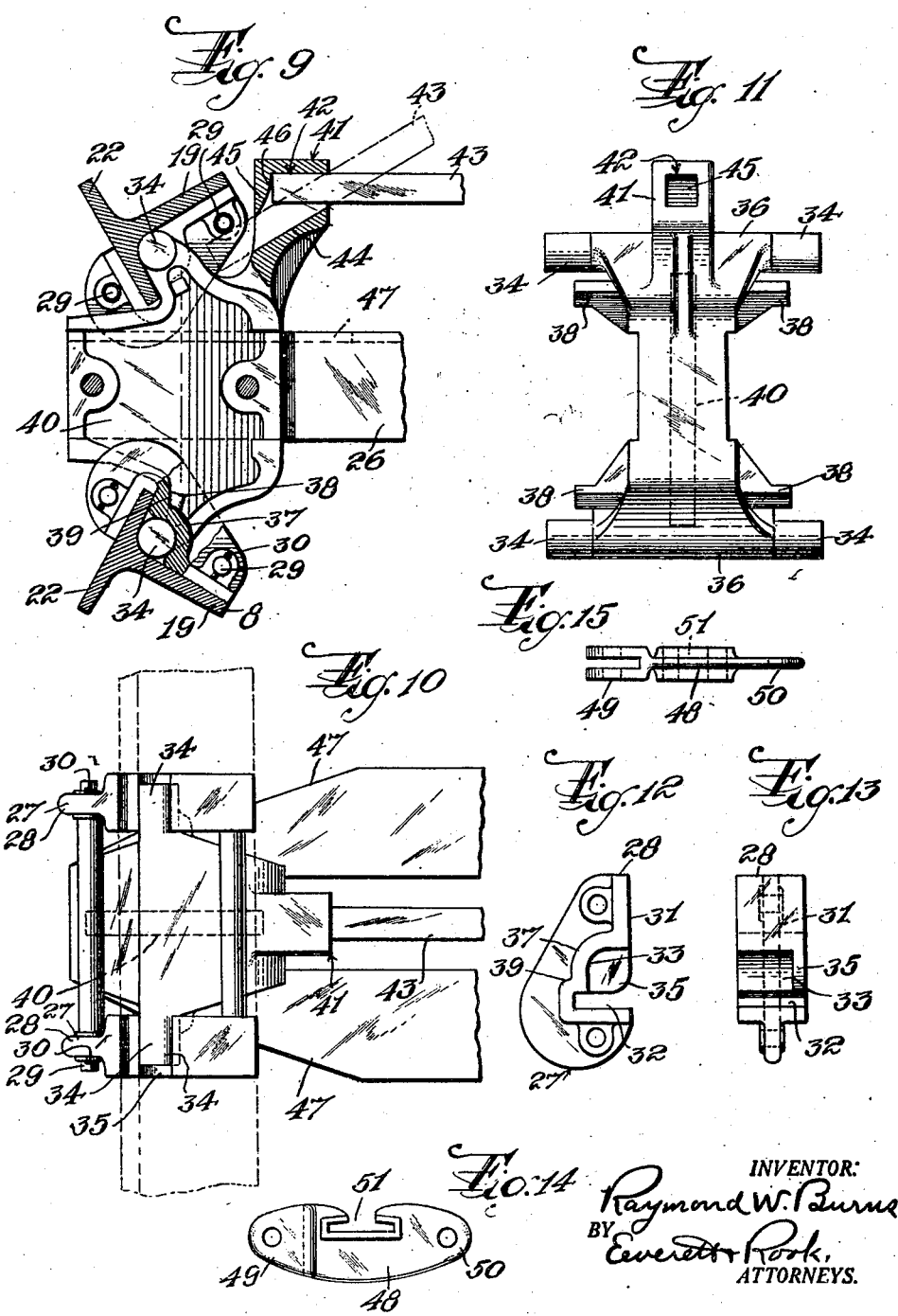

Patented Dec. 20, 1927.

1,653,035

UNITED STATES PATENT OFFICE.

RAYMOND W. BURNS, OF POUGHKEEPSIE, NEW YORK.

CLAMP CARRIER.

Application filed November 12, 1925. Serial No. 68,599.

This invention relates to clamp carriers in which adjacent transverse rows of clamps have the ends of their feet or bases which are next each other mounted upon the same cross-rod, for compactness, as in Patent No. 1,320,808 of November 4, 1919, to James L. Taylor, where the cross-rods being of circular cross-section said feet at opposite sides of a given rod have such an extended bearing on the rod circumferentially thereof that one clamp cannot be slid past another; this hampers the use of the machine especially where two adjacent pieces of work require very different dispositions of clamps. One purpose of this invention is to secure clamp feet or bases which will engage a cross-rod from opposite sides thereof so as to permit clamps of one series to be slid past those of the other series, as by having the bearings of each series upon said rod extend not more than half-way around the rod. This is best done by using cross-rods of some structural cross-section, such as T-bars, rather than round rods as shown in said prior Patent No. 1,320,808, and such cross-bars have the further advantage of being stronger and more rigid than round rods to resist bending or springing in the very wide clamp carriers now being built. Center links can also be readily fixed on cross-rods of structural section, against turning thereon, and serve to stiffen the middle of the conveyor in the chain type of carrier. Of course a different engagement of structural cross-rods with the links of the side chains of such a conveyor, from that of round cross-rods, must be provided, and also since the feet or bases of the clamps cannot pivot on cross-rods of structural section, as they do upon round rods, when a conveyor bends around the ends of a clamp carrier, this pivotal action must be provided for in another way. It is herein shown accomplished by clamp feet or bases each having a middle body part and pivotal end members for engaging cross-rods of T-sections, but I do not wish to be understood as limiting my invention to cross-rods of that particular section or to the particular form of pivotal connection of the clamp feet or bases to cross-rods of structural section which is shown herein. It is also a feature of my invention to utilize links for the side chains of a conveyor which are connected to the cross-rods so that the teeth of the driving sprocket receive between themselves both the rods and portions of the links to drive the conveyor, instead of merely meshing with the links as in said prior Patent No. 1,320,808.

Obviously, the invention relates in many respects to clamp carriers of both the drum type and the chain type, both of which have a series of substantially parallel cross-rods, and it is of course within the scope of the invention to apply any feature of it to any type of carrier in which such feature can be used.

The objects of the invention are to secure in a clamp carrier transverse series of clamps having the adjacent ends of their feet or bases mounted upon the same cross-rod in such a way that the clamps of one series can be slid past those of the other series in adjusting the clamps to the work; to secure an engagement of the clamp feet or bases with said cross-rods which does not extend more than half-way around each rod; to do this by using cross-rods of structural cross-section, thus securing greater strength and rigidity, and in a chain-type carrier to accommodate the conveyor and parts thereof to such cross-rods; to provide improved links at the sides of a conveyor for engaging such improved cross-rods, and improved means for driving said conveyor; to provide improved means between adjacent cross-rods for mounting the clamps thereon; to enable the side chains and intermediate clamp-mounting means of a conveyor to turn with facility at the ends of the clamp carrier; to provide improved means for securing the pivotal movement necessary for that purpose between each clamp foot or base and its supporting cross-rods of structural section; to accomplish such pivoting to cross-rods by feet or bases each having a body part and pivotal end members to engage the cross-rods; to secure a simple and easily assembled construction of foot or base for that purpose; to provide center links each of which is mounted upon a single cross-rod so that it cannot turn thereon, and thus stiffen the middle of the machine; to secure on each clamp foot or base a fixed socket for the holding-down rod which nevertheless holds the latter in both open and closed positions, and to obtain other advantages and results as may be brought out in the following description.

Referring to the accompanying drawings, in which like characters of reference designate the same parts throughout the several views—

Figure 1 is a sectional view of my improved construction taken vertically and longitudinally of the conveyor of a clamp carrier of the chain type, upon line 1—1 of Fig. 3, one of the links being in vertical longitudinal section medially of itself;

Figure 2 shows in perspective an end portion of a cross-rod of T-section;

Figure 3 is an end elevation of a portion of the clamp carrier, looking at the right-hand end of Fig. 1;

Figure 6 is a section on line 4—6, Fig. 3, showing the sprocket end portion of the conveyor;

Figure 7 is a side view of one of the links of the conveyor side-chains, partly broken away and with the cross-rod dotted in;

Figure 8 is a cross-section of the same on line 8—8, Fig. 7;

Figure 9 is a detail view of a single clamp foot or base detached from the machine and with its pivotal end members for engaging the cross-rods swung to their extreme positions, the clamp bar next the observer and one shoe and the socketed arm for the holding-down rod next the observer being removed, and the other shoe next the observer being partly broken away;

Figure 10 is an end plan view of the same, from the top of Fig. 9;

Figure 11 is an outside view from the right-hand side of Fig. 9, with the clamp-bars, holding-down rod and pivotal end members all removed;

Figure 12 is a side view of one of the shoes of the pivotal end members of the foot or base;

Figure 13 is a view of the cross-rod engaging edge of the same;

Figure 14 is a side elevation of one of the center links, and Figure 15 is a bottom view of the same.

Figure 4:
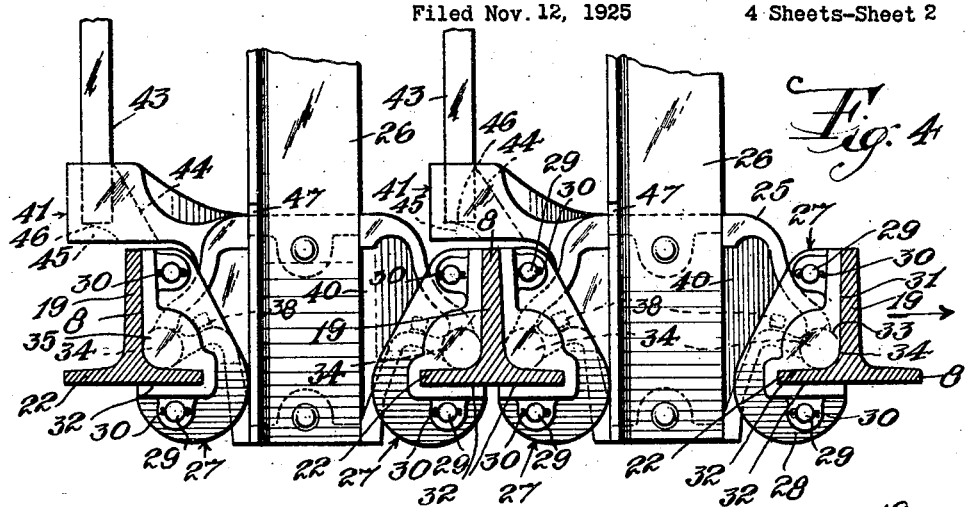
Figure 4 is a vertical longitudinal section as on line 4—6, Fig. 3, showing a portion of the upper straight run of the endless conveyor.

In the specific embodiment of the invention shown in said drawings, 1 indicates one of the sprocket wheels mounted upon a shaft 2 at one end of the clamp carrier and adapted to be driven therefrom to drive an endless conveyor 3 upon which a series of transverse series of projecting clamps 4 are mounted, the side edges of the upper and lower runs of said endless conveyor being supported by upper and lower tracks or runways 5 and 6, respectively, upon upright portions 7 of the frame of the machine, said frame, runways and driving shaft being of any suitable form and arrangement such as shown in said prior Patent No. 1,320,808. The conveyor 3 is composed of side chains and cross-rods upon which the clamps are mounted so that there are as many transverse series of clamps as there are cross-rods, that is, each cross-rod supports the adjacent ends of the feet or bases of two series of clamps. This secures compactness, or high capacity of the machine for a given floor space, but heretofore it has hampered adjustment of clamps transversely of the machine into position to engage the work as desired, since when one series of clamps is filled with work, clamps of the next series can be adjusted only the distances between those of the series containing work. This is because the engagement of the clamp feet or bases extends more than half-way around the cross-rods, and therefore in the present invention I provide cross-rods and clamp feet or bases which engage each other so as to properly support the clamps without the engagement extending far enough around the cross-rod to interfere with an opposite engagement of another foot or base with the same rod. For illustration, I have shown cross-rods consisting of T-bars 8 disposed each with its base inward and parallel to the runways 5, 6 when passing thereover and its rib projecting outward, and the connection of these cross-rods 8 to the links of the side-chains 9 of the conveyor 3, and the relation of both to the driving sprocket 1 is shown in Figures 1–3, 7 and 8, as next described.

Said side-chains are composed of links 10, and each link comprises an elongated body having a tongue 11 at one end and a pair of tongues 12, 12 at the other end so that adjacent links can be pivoted together upon a pin or bolt 13 which also extends outwardly from the chain and carries a roller 14 to travel along the runways 5, 6, as shown. Between the tongued opposite ends of a link 10 its body is apertured as at 15 in the vertical plane of the chain to receive a tooth 16 of the sprocket 1, the ends of the aperture forming seats for the edges of the tooth, as shown in Figure 1 most clearly, and transversely of this apertured body of the link is a slot to receive the end of one of the cross-rods, the slot 17 in this particular case being T-shaped to fit the T-bars 8. Preferably, the angles of this slot 17 are taken off, as at 18, 18 for clearance, and in the construction shown the rib 19 of the T-bar 8 projects from the slot. The side walls of the apertured link are joined, at each side of the outer end of the slot 17 by a bridge 20, and a bolt 21 is put through said bridges 20, 20 and the rib 19 of the T-bar. In this way each end of each T-bar is secured to a link, and to provide clearance for the teeth of the sprocket 1 in entering the apertures 15 of the links, the opposite edges of the base 22 of the T-bar are notched as at 23, 23 in said apertures and each tooth 16 is recessed as at 24 to receive the notched part of the bar.

The ends of the bars extend considerably beyond the links, as shown in Figure 3, for greater strength, the ends of their ribs 19 being beveled as at 81 to clear the runways 6.

As each sprocket tooth 16 enters the aperture 15 of a link 10, it drives against the end wall thereof which is at the end of the link away from the pivoting of said link to the next following link, so that straight line motion is secured, without any tendency to oscillate the link. Oscillation and lateral movement of the link are further prevented by the tooth 16 completely entering the aperture of the link, as it progresses, until both front and rear edges of the tooth engage the end walls of the aperture and thus prevent any rocking of the links as they pass over the sprockets. A very firm and secure engagement of the conveyor with the sprocket is thus secured, and consequent stability of the projecting clamps.

Figure 5:
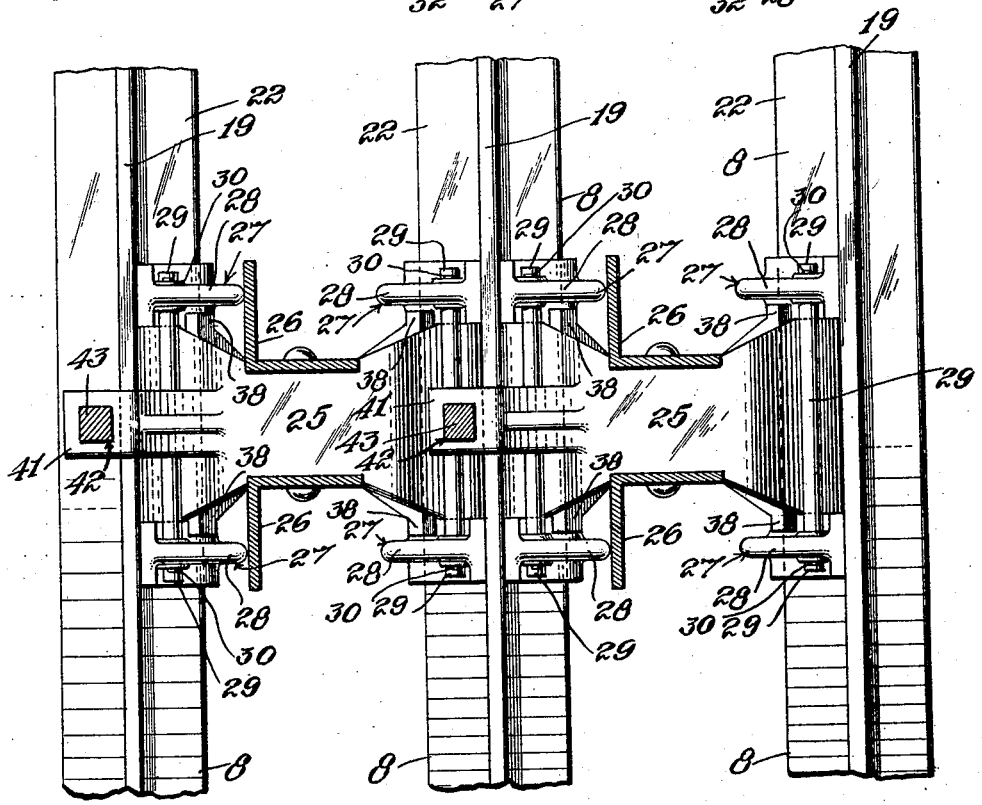
Figure 5 is a plan of the same.

The use of a cross-rod of structural cross-section precludes a direct rotatable engagement of it by the foot or base of a clamp, such as can be obtained by journaling a round cross-rod in a bearing in the foot or base as shown in prior Patent No. 1,320,808 above referred to, and therefore I employ for supporting each clamp a foot having a body 25, see Figures 4-5 and 9-13, to opposite sides of which the angle bars 26, 26 of a bar clamp can be bolted and having end members 27, 27 which seat fixedly against the sides of adjacent cross-rods 8 and are pivotally connected to the body 25 between them. As shown, each of these pivotal end members consists of a pair of shoes 28, 28 one at each end of the body and held there by upper and lower connecters, such as the pins 29, 29 each having its ends reduced to enter holes through the shoes and receive at the outer sides thereof cotter pins 30 or other suitably removable fastening means. Said shoes each have a face 31 which fits against the rib 19 of a T-bar, and a recessed seat 32 which receives the adjacent projecting portion of the base 22 of the bar, and between said face and seat the shoe has a bearing 33 for a laterally projecting trunnion 34 on said body, said bearing not extending through the entire thickness of the shoe but leaving an outer wall 35 to overlie the end of the trunnion and cover or conceal the bearing, see Figures 12 and 13. This provides for the pivotal movement which is necessary between the body 25 of the clamp foot or base and its end members 27 when the conveyor rounds the ends of the machine, since in the present construction said end members have no movement with respect to the cross-rods 8 shown. It will be noted that the body 25 has transverse under-cut ends 36 each adapted to seat pivotally in the side angle of a cross T-bar 8, as most clearly shown in Figures 4 and 9, and in this case each pair of trunnions 34, 34 is preferably on such an end 36 and flush therewith at the extremity of the body. The shoes 28 then serve chiefly to hold said trunnions and end of the body positioned in the angle of the T-bar, and to prevent said shoes from any sliding movement off the base flange of the T-bar each shoe is provided with an arcuate bearing 37, concentric with its bearing 33 but oppositely facing, to engage a lug 38 projecting laterally from the body 25. This lug 38 is shown engaging a stop 39 at one end of the arcuate bearing 37 when the foot or base is out of the machine, see Figure 9, thus limiting swinging of the shoe on the trunnion 34 in one direction, and the upper connecter 29 obviously limits it in the other direction by engaging the end wall of the body 25. The lower connecter 29 would serve as a limit except that the stop 39 is more conveniently used and acts a little sooner. These limits do not come into play at all when the clamp foot or base is mounted on the cross-rods 8 in the machine, but only when the foot or base is removed, when they prevent the end members from turning on the trunnions 34 until they would fall off.

The body portion 25, which by itself is best seen in Figure 11, is deeply recessed at its sides to a web 40, in order to lighten the body and save material, and is provided at the end of itself adjacent the work-receiving side of the clamp-bars 26, 26 with an arm 41 having a socket 42 to receive the end of a holding-down rod 43, see Figures 4-6 and 9-11. This socket 42 has one portion 44 extending obliquely clear through the arm 41 so that the rod 43 when raised for the clamp to be loaded or unloaded can be pushed inwardly through said oblique portion until its end portion lies beneath both the upper wall 45 of the rear end of the socket and the upper shoe-connecting pin 29, which holds it elevated at its outer end for taking out or putting in work. Above said oblique portion 44 is a recess 46 into which the extremity of the holding-down rod 43 rises when it is drawn slightly forward and closed down against the work, the upper rear end wall 45 of the socket preventing rearward movement of the rod.

The ends of the clamp bars 26 which are bolted to the opposite sides of the foot or base by their parallel flanges have their outwardly projecting flanges beveled longitudinally, as at 47, which affords clearance for the shoes 27 as will be seen from Figures 9 and 10.

It will be noted that the construction of clamp feet or bases shown herein, so that each consists of separable parts, enables and facilitates the removal of one from the machine and its replacement by another, without disassembling the machine.

By making the cross-rods of a clamp carrier of structural cross-section, as the T-bars illustrated herein, it is easy to provide the conveyor 3 with a series of center links 48, see Figures 3, 14 and 15, each upon a cross-rod 8 intermediate its ends and pivoted to the next adjoining center links. The word "center" as just applied to "links" is used in the manufacture of clamp carriers in the sense of intermediate the ends of the cross-rods or between the side chains herein marked 9 of the conveyor herein marked 3, not necessarily equidistant from the ends of said cross-rods, and it is in that sense that the word "center" is used in the description and the following claims. In a wide clamp carrier having a large number of clamps in each transverse series, the conveyor is preferably provided with one or more series of such center links, where they do not interfere with any adjustment of clamps which is necessary, and they serve to stiffen and strengthen the conveyor. Each link is bifurcated at one end, as at 49, and provided with a central tongue 50 at the other end, so the links can be pivoted together, and each link has intermediate its ends and in its upper edge a slot 51 to fixedly hold a cross-rod 8, said slot in the present case being T-shaped to receive the base of the cross-bar which when slid thereinto is held against any other movement with respect to the center-link. This distributes the individual loads of the clamps and resists displacement of the cross-rods with respect to one another under strain.

Obviously many structural modifications could be made by those skilled in the art, in building my improved clamp carrier, without departing from the spirit and scope of the invention, and I do not wish to be understood as limiting myself except as required by the following claims when construed in the light of the prior art.

Having thus described the invention what I claim is:

1. The combination with a plurality of substantially parallel rods, of adjustable clamp feet or bases mounted each on two adjacent rods with feet which are adjacent transversely of the rods having their ends next each other mounted on the same cross-rod so as to one pass the other, and clamps on said feet or bases.

2. The combination with a plurality of substantially parallel rods, of adjustable clamp feet or bases mounted each on two adjacent rods with feet which are adjacent transversely of the rods having their ends next each other mounted on the same cross-rod so as to pass each other, and clamps on said feet or bases.

3. The combination with a plurality of substantially parallel rods, of adjustable clamp feet or bases mounted each on two adjacent rods with feet which are adjacent transversely of the rods having their ends next each other engaging the same cross-rod and slidable thereon one past the other, and clamps on said feet or bases.

4. In a clamp carrier, the combination with a series of cross-rods, means enabling said series to be moved longitudinally of itself, adjustable clamp feet or bases mounted each on two adjacent cross-rods with longitudinally adjacent feet having their ends next each other mounted on the same cross-rod so as to one pass the other, and clamps on said feet or bases.

5. In a clamp carrier, the combination with a series of cross-rods, means enabling said series to be moved longitudinally of itself, adjustable clamp feet or bases mounted each on two adjacent cross-rods with longitudinally adjacent feet having their ends next each other mounted on the same cross-rod so as to pass each other, and clamps on said feet or bases.

6. The combination with a plurality of substantially parallel rods, of adjustable clamp feet or bases mounted each on two adjacent rods with feet which are adjacent transversely of the rods having their ends next each other mounted upon different portions of the same cross-rod transversely thereof and adapted to one pass the other, and clamps on said feet or bases.

7. The combination with a plurality of substantially parallel rods, of adjustable clamp feet or bases mounted each on two adjacent rods with feet which are adjacent transversely of the rods having their ends next each other slidable upon different longitudinal portions of the surface of the same rod and adapted to one pass the other, and clamps on said feet or bases.

8. The combination with a plurality of substantially parallel rods of structural cross-section, of adjustable clamp feet or bases mounted each on two adjacent rods with feet which are adjacent transversely of the rods having their ends next each other mounted on the same cross-rod so as to one pass the other, and clamps on said feet or bases.

9. The combination with a plurality of substantially parallel rods of structural cross-section, of adjustable clamp feet or bases mounted each on two adjacent rods with feet which are adjacent transversely of the rods having their ends next each other mounted upon different portions of the same cross-rod transversely thereof and adapted to one pass the other, and clamps on said feet or bases.

10. The combination with a plurality of substantially parallel T-bars, of adjustable clamp feet or bases mounted each on two adjacent bars with feet which are adjacent transversely of the bars having their ends next each other mounted on the same cross-bar so as to one pass the other, and clamps on said feet or bases.

11. The combination with a plurality of substantially parallel T-bars, of adjustable clamp feet or bases mounted each on two adjacent bars with feet which are adjacent transversely of the bars having their ends next each other mounted upon different portions of the same cross-bar transversely thereof and adapted to one pass the other, and clamps on said feet or bases.

12. The combination with a plurality of substantially parallel T-bars, of adjustable clamp feet or bases mounted each on two adjacent bars with feet which are adjacent transversely of the bars having their ends next each other mounted upon opposite sides of the same cross-bar and adapted to one pass the other, and clamps on said feet or bases.

13. The combination with a plurality of substantially parallel T-bars, of adjustable clamp feet or bases mounted each on two adjacent bars with feet which are adjacent transversely of the bars having their ends next each other mounted upon opposite base flanges of the same cross-bar and adapted to one pass the other, and clamps on said feet or bases.

14. The combination with a plurality of substantially parallel T-bars, of adjustable clamp feet or bases mounted each on two adjacent bars with feet which are adjacent transversely of the bars having their ends next each other engaging the same cross-bar at opposite sides of the plane of its rib and adapted to one pass the other, and clamps on said feet or bases.

15. The combination with a plurality of substantially parallel T-bars, of adjustable clamp feet or bases mounted each on two adjacent bars with feet which are adjacent transversely of the bars seated at their ends next each other in the opposite angles of the same cross-bar between its rib and base flanges and adapted to pass each other, and clamps on said feet or bases.

16. The combination with substantially parallel rods providing facing lateral seats, of a clamp foot or base comprising a body portion with opposite ends in said facing lateral seats, means on said body portion for engaging the rods to hold said ends seated, and a clamp on said foot or base.

17. The combination with substantially parallel rods providing facing lateral seats, of a clamp foot or base comprising a body portion with opposite ends slidably seated in said facing lateral seats, means on said body portion for slidably engaging the rods to hold said ends seated, and a clamp on said foot or base.

18. The combination with a plurality of substantially parallel rods each providing opposite lateral seats, of clamp feet or bases each comprising a body portion with opposite ends slidably seated in the facing lateral seats of two adjacent rods, means on said body portion for slidably engaging the rods to hold said ends seated, the said means at one side of a cross-rod being slidable past those at the opposite side of the same cross-rod, and clamps on said feet or bases.

19. The combination with substantially parallel T bars, of a clamp foot or base having a body portion with opposite ends slidably seated in the facing angles of said bars, means on said body portion for slidably engaging the bars to hold said ends seated, and a clamp on said foot or base.

20. In a clamp carrier, the combination with a plurality of cross-rods each providing opposite lateral seats, of clamp feet or bases each comprising a body portion with opposite ends pivotally seated in the facing lateral seats of two adjacent rods, means on said body portion for engaging the rods to hold said ends seated, and clamps on said feet or bases.

21. In a clamp carrier, the combination with a plurality of cross-rods each providing opposite lateral seats, of clamp feet or bases each comprising a body portion with opposite ends pivotally and slidably seated in the facing lateral seats of two adjacent rods, means on said body portion for slidably engaging the rods to hold said ends seated, and clamps on said feet or bases.

22. In a clamp carrier, the combination with a plurality of cross-rods each providing opposite lateral seats, of clamp feet or bases each comprising a body portion with opposite ends pivotally and slidably seated in the facing lateral seats of two adjacent rods, means on said body portion for slidably engaging the rods to hold said ends seated, the said means at one side of a cross-rod being slidable past those at the opposite side of the same cross-rod, and clamps on said feet or bases.

23. In a clamp carrier, the combination with a plurality of T-section cross-rods, of clamp feet or bases each having a body portion with opposite ends pivotally and slidably seated in the facing angles of two adjacent rods, means on said body portion for slidably engaging the rods to hold said ends seated, and clamps on said feet or bases.

24. The combination with substantially parallel rods, of a clamp foot or base having a body portion between said rods and pivotal end members each engaging its rod, and a clamp on said foot or base.

25. The combination with substantially parallel rods, of a clamp foot or base having a body portion between said rods and pivotal end members each slidably engaging its adjacent rod, and a clamp on said foot or base.

26. The combination with a plurality of substantially parallel rods, of clamp feet or bases each having a body portion between two adjacent rods and pivotal end members each slidably engaging its adjacent rod so that those end members engaging opposite sides of the same rod will slide past each other, and clamps on said feet or bases.

27. The combination with substantially parallel rods, of a clamp foot or base having a body portion between said rods and end members pivoted to said body portion and non-rotatably engaging each its adjacent rod, and a clamp on said foot or base.

28. The combination with substantially parallel rods of structural cross-section, of a clamp foot or base having a body portion between said rods and end members pivoted to said body portion and engaging each its adjacent rod, and a clamp on said foot or base.

29. The combination with substantially parallel rods, of structural cross-section, of a clamp foot or base having a body portion between said rods and end members pivoted to said body portion and slidably engaging each its adjacent rod, and a clamp on said foot or base.

30. The combination with a plurality of substantially parallel rods of structural cross-section, of clamp feet or bases each having a body portion between two adjacent rods and end members pivoted to said body portion and slidably engaging each its adjacent rod so that those end members engaging opposite sides of the same rod will slide past each other, and clamps on said feet or bases.

31. The combination with substantially parallel T-section rods, of a clamp foot or base having a body portion between said rods and end members pivoted to said body portion and engaging each its adjacent rod, and a clamp on said foot or base.

32. The combination with substantially parallel T-section rods, of a clamp foot or base having a body portion between said rods and end members pivoted to said body portion and slidably engaging each its adjacent rod, and a clamp on said foot or base.

33. The combination with a plurality of substantially parallel T-section rods, of clamp feet or bases each having a body portion between two adjacent rods and end members pivoted to said body portion and slidably engaging each its adjacent rod so that those engaging opposite sides of the same rod will slide past each other, and clamps on said feet or bases.

34. The combination with substantially parallel rods of structural cross-section, of a clamp foot or base having a body portion between said rods, shoes pivoted to the opposite sides of each end of said body portion each end pair engaging its adjacent rod, and a clamp on said foot or base.

35. The combination with substantially parallel rods of structural cross-section, of a clamp foot or base having a body portion between said rods, shoes pivoted to the opposite sides of each end of said body portion each end pair slidably engaging its adjacent rod, and a clamp for said foot or base.

36. The combination with a plurality of substantially parallel rods of structural cross-section, of clamp feet or bases each having a body portion between two adjacent rods, shoes pivoted to the opposite sides of each end of said body portion each end pair slidably engaging its adjacent rod so that pairs on opposite sides of the same rod will slide past each other, and clamps on said feet or bases.

37. The combination with a plurality of substantially parallel T-section rods, of clamp feet or bases each having a body portion between two adjacent rods, shoes pivoted to the opposite sides of each end of said body portion each end pair slidably engaging its adjacent rod so that pairs on opposite sides of the same rod will slide past each other, and clamps on said feet or bases.

38. The combination with substantially parallel rods of structural cross-section, of a clamp foot or base having a body portion between said rods and having lateral trunnions at each end of itself, shoes on said trunnions each end pair engaging its adjacent rod, means for holding the shoes of each pair in alinement, and a clamp on said foot or base.

39. The combination with a plurality of substantially parallel T-shaped rods, of clamp feet or bases each having a body portion between two adjacent rods, shoes pivoted to the opposite sides of each end of said body portion each end pair slidably engaging one base flange and the contiguous side of the rib of its adjacent rod so that pairs on opposite sides of the same rod will slide past each other, and clamps on said feet or bases.

40. The combination with substantially parallel rods providing facing lateral seats, of a clamp foot or base having a body portion with opposite ends in said facing lateral seats, said ends each having terminal trunnions alined therewith in its seat, a shoe for each trunnion having an open-sided bearing for the same each end pair of shoes engaging its adjacent rods, means for holding said shoes in place on said trunnions, and a clamp on said foot or base.

41. The combination with substantially parallel rods, providing facing lateral seats, of a clamp foot or base having a body portion with opposite ends in said facing lateral seats, said ends each having terminal trunnions alined therewith in its seat and the body portion having lateral projections one adjacent each trunnion, a shoe for each trunnion having a curvilinear bearing rib between the trunnion and its adjacent projection each end pair of shoes engaging its adjacent rod, means for holding said shoes in place on said trunnions, and a clamp on said foot or base.

42. The combination with substantially parallel rods providing facing lateral seats, of a clamp foot or base having a body portion with opposite ends in said facing lateral seats, said ends each having terminal trunnions alined therewith in its seat, a shoe for each trunnion having an open-sided bearing for the same each end pair of shoes engaging its adjacent rod, means for holding said shoes from escaping longitudinally from said trunnions, means for holding said shoes from escaping laterally from said trunnions, and a clamp on said foot or base.

43. The combination with substantially parallel rods providing facing lateral seats, of a clamp foot or base having a body portion with opposite ends in said facing lateral seats, said ends each having terminal trunnions alined therewith in its seat, a shoe for each trunnion having an open-sided bearing for the same each end pair of shoes engaging its adjacent rod, upper and lower connecters for the shoes of each end pair above and below the end of the body portion, and a clamp on said foot or base.

44. The combination with substantially parallel rods, of a foot or base engaging said rods and having a holding-down rod socket with end portions to retain the rod in elevated position and an enlarged middle portion to receive the end of the rod in lowered position, and a clamp on said foot or base.

45. The combination with substantially parallel rods, of a foot or base engaging said rods and having an arm with a holding-down rod socket with end portions opening through opposite sides of said arm and adapted to hold the rod in elevated position and an enlarged middle portion to receive the rod in lowered position, and a clamp on said foot or base.

46. The combination with substantially parallel rods of a foot or base having a body portion and pivoted end members for engaging said rods, said body portion having adjacent one of said end members an arm with a holding-down rod socket extending therethrough and having an enlarged portion, a holding-down rod whose end portion may be extended through said socket into engagement with the adjacent end member to retain the rod in elevated position and may lie in the enlarged portion of the socket when the rod is in depressed position, and a clamp on said foot or base.

47. In a clamp carrier, the combination with a series of cross-rods, of side chains comprising links each having a transverse aperture for one of said cross-rods and a longitudinal aperture intersecting said transverse aperture, and a sprocket having teeth each adapted to enter said longitudinal aperture and recessed to receive the cross-rod in said transverse aperture.

48. In a clamp carrier, the combination with a series of cross-rods, of side chains comprising links each having a transverse aperture for one of said cross-rods and a longitudinal aperture intersecting said transverse aperture, and a sprocket having teeth each adapted to enter said longitudinal aperture and engage one end wall thereof and recessed to clear the cross-rod in said transverse aperture.

49. In a clamp carrier, the combination with a series of cross-rods of structural cross-section, of side chains comprising links each having a transverse slot fitting one of said cross-rods and a longitudinal slot intersecting said transverse slot, and a sprocket having teeth each adapted to enter said longitudinal slot and recessed to receive the cross-rod in said transverse slot.

50. In a clamp carrier, the combination with a series of cross-rods of structural cross-section, of side chains comprising links each having a transverse slot fitting one of said cross-rods and opening through the outer edge of the link and having projections on said outer edge at opposite sides of said slot, a bolt through said projections and the cross-rod in the slot, and means for driving said side chains.

51. In a clamp carrier, the combination with a series of cross-rods of structural cross-section, of side chains comprising links each having a transverse slot fitting one of said cross-rods and opening through the outer edge of the link and having a longitudinal slot intersecting said transverse slot and also opening through the said outer edge of the link, bridges at said outer edge across said longitudinal slot on opposite sides of the transverse slot, a bolt through said bridges and the cross-rod in the transverse slot, and a sprocket having teeth each adapted to enter said longitudinal slot and recessed to receive the cross-rod in said transverse slot.

52. In a clamp carrier, the combination with a series of cross-rods of structural cross-section, of side chains comprising links each having a transverse slot fitting one of said cross-rods, means for holding said cross-rods against sliding longitudinally out of said slot, and means for driving the side chains.

53. In a clamp carrier, the combination with a series of T-section cross-rods each having an end portion with the base flanges notched, of side chains comprising links each having a transverse slot fitting one of said cross-rod end portions and a longitudinal slot intersecting said transverse slot in alinement with the notches of the cross-rod, and a sprocket having teeth each adapted to enter said longitudinal slot and notches and recessed to receive the cross-rod.

54. In a clamp carrier, the combination with a series of cross-rods and side chains for said cross rods, of center links each non-rotatably fixed on a cross-rod between said side chains and pivoted at its ends to the next adjacent center links.

55. In a clamp carrier, the combination with a series of cross-rods of structural cross-section and side chains for said cross-rods, of certain links each fast against turning on a cross-rod between said side chains and pivoted at its ends to the next adjacent center links.

56. In a clamp carrier, the combination with a series of cross-rods of T-section and side chains for said cross-rods, of center links each non-rotatably fixed on a cross-rod between said side chains and pivoted at its ends to the next adjacent center links.

57. In a clamp carrier, the combination with a series of cross-rods of T-section and side chains for said cross-rods, of center links each slotted intermediate its ends to receive a cross-rod between said side chains, and pivoted at its ends to the next adjacent center links.

58. In a clamp carrier, the combination with a series of cross-rods of T-section and side chains for said cross-rods, of center links each slotted intermediate its ends to receive the base of a cross-rod between said side chains, and pivoted at its ends to the next adjacent center links.

59. The combination with substantially parallel rods, of a clamp foot or base having a body portion between said rods and detachable end members each engaging its adjacent rod, and a clamp on said foot or base.

60. The combination with substantially parallel rods, of a clamp foot or base having a body portion between said rods and detachable end members each slidably engaging its adjacent rod, and clamps on said feet or bases.

61. The combination with substantially parallel rods of a clamp foot or base having a body portion between said rods and detachable end members non-rotatably engaging each its adjacent rod, and a clamp on said foot or base.

62. The combination with substantially parallel rods of structural cross-section, of a clamp foot or base having a body portion between said rods and detachable end members engaging each its adjacent rod, and a clamp on said foot or base.

63. The combination with substantially parallel T-section rods, of a clamp foot or base having a body portion between said rods and detachable end members engaging each its adjacent rod, and a clamp on said foot or base.

64. In a clamp carrier, the combination of side chains comprising links pivoted together and having each a longitudinal aperture extending close to its pivoted ends, a sprocket having teeth adapted to enter said link apertures, cross rods connected to said links each midway between the ends of the said aperture of a link and spaced from said ends, clamp feet or bases between adjacent cross-rods, and clamps projecting one from each of said feet or bases.

65. In a clamp carrier, the combination with a series of cross-rods, of side chains comprising links each having a transverse aperture for one of said cross-rods and a longitudinal aperture intersecting said transverse aperture, and a sprocket having teeth each adapted to enter said longitudinal aperture and engage both end walls thereof and recessed to clear the cross-rod in said transverse aperture.

66. A clamp having at one end of itself a holding-down rod socket with end portions to retain the rod in elevated position and an enlarged middle portion to receive the end of the rod in depressed position.

67. A clamp having at one end of itself a holding-down rod socket with end portions to retain the rod in elevated position and an enlarged middle portion to receive the end of the rod in depressed position, a holding-down rod, and means at the other end of the clamp for securing said rod in depressed position.

68. A clamp having at one end of itself a socket into which one end of a holding-down rod can be pushed, said socket having a stop to engage the end of the rod in lowered position and beneath which stop said end of the rod may pass when the rod is elevated to retain it in elevated position.

69. A clamp having at one end of itself a holding-down rod socket with an enlarged portion to receive the end of the rod in depressed position and a stop beneath which said end of the rod may pass to hold the rod in elevated position.

RAYMOND W. BURNS.